US012782752B2

(12) United States Patent
Michelon et al.

(10) Patent No.: US 12,782,752 B2
(45) Date of Patent: Nov. 3, 2026

(54) ELECTRONIC EYEGLASSES

(71) Applicant: LUXOTTICA S.R.L., Agordo (IT)

(72) Inventors: Dino Michelon, Ponte Nelle Alpi (IT); Enrico Toigo, Agordo (IT)

(73) Assignee: LUXOTTICA S.R.L., Agordo (IT)

( * ) Notice: Subject to any disclaimer, the term of this patent is extended or adjusted under 35 U.S.C. 154(b) by 255 days.

(21) Appl. No.: 18/681,368

(22) PCT Filed: Jul. 27, 2022

(86) PCT No.: PCT/EP2022/071118
§ 371 (c)(1),
(2) Date: Feb. 5, 2024

(87) PCT Pub. No.: WO2023/012014
PCT Pub. Date: Feb. 9, 2023

(65) Prior Publication Data

US 2024/0345415 A1 Oct. 17, 2024

(30) Foreign Application Priority Data

Aug. 5, 2021 (IT) ........................ 102021000021212

(51) Int. Cl.
*G02C 5/14* (2006.01)
*G02B 27/01* (2006.01)
(Continued)

(52) U.S. Cl.
CPC ........... *G02C 5/14* (2013.01); *G02B 27/0176* (2013.01); *G02C 5/22* (2013.01); *G02C 11/10* (2013.01); *G02B 2027/0178* (2013.01)

(58) Field of Classification Search
CPC . G02C 5/14; G02C 5/22; G02C 11/10; G02B 27/0176; G02B 2027/0178
(Continued)

(56) References Cited

U.S. PATENT DOCUMENTS 10,904,667 B1 1/2021 Zhong et al.
11,061,252 B2 7/2021 Blum et al.
(Continued)

FOREIGN PATENT DOCUMENTS

CN 110383147 A 10/2019
CN 111897263 A 11/2020
(Continued)

OTHER PUBLICATIONS

International Search Report for International Application No. PCT/EP2022/071118, dated Oct. 11, 2022, 5 pages.
(Continued)

*Primary Examiner* — Bumsuk Won
*Assistant Examiner* — Mitchell T Oestreich
(74) *Attorney, Agent, or Firm* — CANTOR COLBURN LLP

(57) ABSTRACT

Electronic eyeglasses, including a front and a pair of temples adapted to be connected to the front by respective hinges; at least one of the temples includes a capacitive sensor in order to allow to enter an input on the part of a user and a double capacitive sensor which is joined thereto and is adapted to detect the condition of the eyeglasses being worn or not by the user and a haptic feedback component in order to return to the user a notification regarding the input entered or other functionalities of the eyeglasses.

14 Claims, 4 Drawing Sheets

(51) Int. Cl.
*G02C 5/22* (2006.01)
*G02C 11/00* (2006.01)

(58) Field of Classification Search
USPC .......................................................... 351/111
See application file for complete search history.

(56) References Cited

U.S. PATENT DOCUMENTS

| | | | | |
|---|---|---|---|---|
| 2015/0156196 | A1* | 6/2015 | Kim | G02C 11/10 726/5 |
| 2016/0063919 | A1 | 3/2016 | Ha et al. | |
| 2018/0095299 | A1 | 4/2018 | Cazalet et al. | |
| 2019/0033622 | A1 | 1/2019 | Olgun et al. | |
| 2019/0235284 | A1 | 8/2019 | Blum et al. | |
| 2019/0346697 | A1 | 11/2019 | Kan et al. | |
| 2020/0133031 | A1 | 4/2020 | Muramatsu et al. | |

FOREIGN PATENT DOCUMENTS

| | | | |
|---|---|---|---|
| CN | 112533102 | A | 3/2021 |
| JP | 2016039632 | A | 3/2016 |
| JP | 3224798 | U | 12/2019 |
| KR | 101157367 | B1 | 6/2012 |
| WO | 2015002377 | A1 | 1/2015 |
| WO | 2018168644 | A1 | 9/2018 |

OTHER PUBLICATIONS

Italian Search Report for Application No. 102021000021212, dated Mar. 23, 2022, 9 pages.

Pei-Hsuan Lo et al: "Development of a proximity sensor with vertically monolithic integrated inductive and capacitive sensing units", J. Micromech. Microeng., vol. 23, No. 3, Jan. 28, 2013, 10 pages.

Written Opinion for International Application No. PCT/EP2022/071118, dated Oct. 11, 2022, 5 pages.

Japanese Office Action for Application No. 2024-506712, dated Apr. 21, 2026, 11 pages with translation.

Mexican Office Action for Application No. MX/a/2024/001703, dated Jul. 23, 2026, 10 pages.

Chinese Office Action for Application No. 202280054614.0, dated Jun. 19, 2026, 15 pages with translation.

Korean Office Action for Application No. 10-2024-7006283, dated Jul. 27, 2026, 10 pages, English translation.

* cited by examiner

ELECTRONIC EYEGLASSES

CROSS-REFERENCE TO RELATED APPLICATIONS

This application is a 35 U.S.C. § 371 National Stage patent application of PCT/EP2022/071118, filed on 27 Jul. 2022, which claims the benefit of Italian patent application 102021000021212, filed on 5 Aug. 2021, the disclosures of which are incorporated herein by reference in their entirety.

TECHNICAL FIELD

The present disclosure relates to electronic eyeglasses. More particularly, the disclosure relates to electronic eyeglasses with integrated electronic components and sensors.

The present disclosure relates, merely by way of example, to: electronically focused eyeglasses, electroactive or electrochromic eyeglasses, electronic eyeglasses providing 3D capabilities, fluid lenses activated by means of an electronic actuator, mechanical or membrane lenses activated by means of electronics, electrochromic lenses, electronic rapid color changing liquid crystal lenses, lenses whose color can be altered electronically, lenses that by means of an electrical charge can contrast or reduce the attraction of dust particles, lenses or frames for eyeglasses that accommodate or have an electronic display applied to them, electronic eyeglasses for virtual reality, electronic eyeglasses that provide 3D capabilities, electronic eyeglasses for computer games, and electronic eyeglasses for augmented reality.

BACKGROUND

As is known, electronic eyeglasses are increasingly widespread on the market and each product tends to optimize the space necessary for housing the various electronic components, in order to make the electronic eyeglasses as similar as possible to conventional eyeglasses, improving therefore their aesthetics.

Improvement in the aesthetics of eyeglasses is accompanied by increasingly extreme research to optimize the spaces for housing electronics and components, particularly the battery, as well as to provide sensors adapted to detect a voluntary action by the user, so that it is possible to implement functions of the electronic eyeglasses that can be activated on command of the user, as well as components adapted to provide feedback to the user if an action is performed or to notify information (for example, external temperature, battery status, mode of use, etcetera).

The expression "electronic components" refers, by way of example, to one or more of the following: a manual switch (for example, a touch button, a photo detector, a motion detector, a capacitive sensor), a controller and/or a microprocessor, a power source (for example, a battery), a sensor (for example, one or more miniaturized switches or micro tilt switches, accelerometer, micro gyroscope, rangefinder, sight detector, imager), an antenna, an RFID, a transmitter, a transceiver, or a receiver. The electronic device accommodates within at least one temple preferably any one of the above-mentioned electrical components, in an environment that is substantially waterproof and wear-resistant as well as moisture-resistant and hermetically sealed.

Electronic devices are known in which the various electronic components are located on the side of one or both temples, inside or at the end of the temple, inside or on the bridge of the frame of the eyeglasses, attached to the hinge of the temple, etcetera. However, these solutions do not minimize the space occupation of the electronics while maintaining the aesthetics of the frame and of the eyeglasses in general.

Normally, capacitive sensors are intended to detect a variation in the electrostatic field, be it generated for example by an action on the part of a user (for example, touches with the fingers on the frame or temple of the eyeglasses) or by objects that simulate the manual action (for example, a compatible capacitive pen).

In addition, devices are known which allow to detect whether or not the eyeglasses are being worn by the user, so that the electronics can be activated accordingly, therefore avoiding battery consumption when the eyeglasses are in an idle state and the user does not need to have at his disposal the electronic functions which with the eyeglasses are provided. Specifically, the condition of the eyeglasses being worn is detected by the device by means of a double capacitive sensor, which, by means of a threshold system, is able to detect in a reliable manner the condition of the eyeglasses being worn or not worn.

SUMMARY

The aim of the present disclosure is to provide electronic eyeglasses in which the number and the position of the capacitive sensors and of the sensors adapted to detect the condition of the eyeglasses being worn or not worn, as well as the spaces for housing electronics, are optimized, also in order to make the electronic eyeglasses as similar as possible to conventional eyeglasses.

Within this aim, the present disclosure provides electronic eyeglasses that are lightweight, functional and easy to use.

the present disclosure also provides electronic eyeglasses in which charging can occur both by means of an external support and with the charging socket on the temple and with the temple closed.

Not least the present disclosure provides electronic eyeglasses that are highly reliable, relatively easy to provide and at competitive costs.

This aim and these and other advantages which will become better apparent hereinafter are achieved by providing electronic eyeglasses comprising a front and a pair of temples adapted to be connected to the front by means of respective hinges, characterized in that at least one of said temples comprises a capacitive sensor in order to allow to enter an input on the part of a user and a double capacitive sensor which is joined thereto and is adapted to detect the condition of the eyeglasses being worn or not by the user and a haptic feedback component in order to return to the user a notification regarding the input entered or other functionalities of the eyeglasses.

The double capacitive sensor comprises at least one active area designed to be directed toward the inside of the temple, i.e., toward the head of the user who wears the eyeglasses, and at least one active area designed to be directed toward the outside of the temple.

The two active areas provide two different values: the final value that is detected and used as indicator that the eyeglasses are being worn or not worn is given by a difference between the value detected by the inner active area and the one detected by the outer active area.

The device according to the disclosure can self-calibrate to the specific head of the user, so as to avoid false positives or in any case wrong signals.

The device is capable of calculating a base value and a high value, as well as a threshold value. The base value is defined as the value detected by the device when the eyeglasses are not being worn. The high value is instead calculated as a value during a period in which the eyeglasses are being worn. The threshold value is, at this point, calculated as the difference between the high value and the base value.

In an alternative embodiment, in addition to self-calibration, the threshold value can be factory preset as optimum value for identifying whether the eyeglasses are being worn or not. In this manner, the user can decide whether to self-calibrate the device or use the already preset functions.

BRIEF DESCRIPTION OF THE DRAWINGS

Further characteristics and advantages of the disclosure will become better apparent from the description of a preferred but not exclusive embodiment of the electronic eyeglasses according to the disclosure, illustrated by way of non-limiting example in the accompanying drawings, wherein.

DETAILED DESCRIPTION OF THE DRAWINGS

Figure 1:
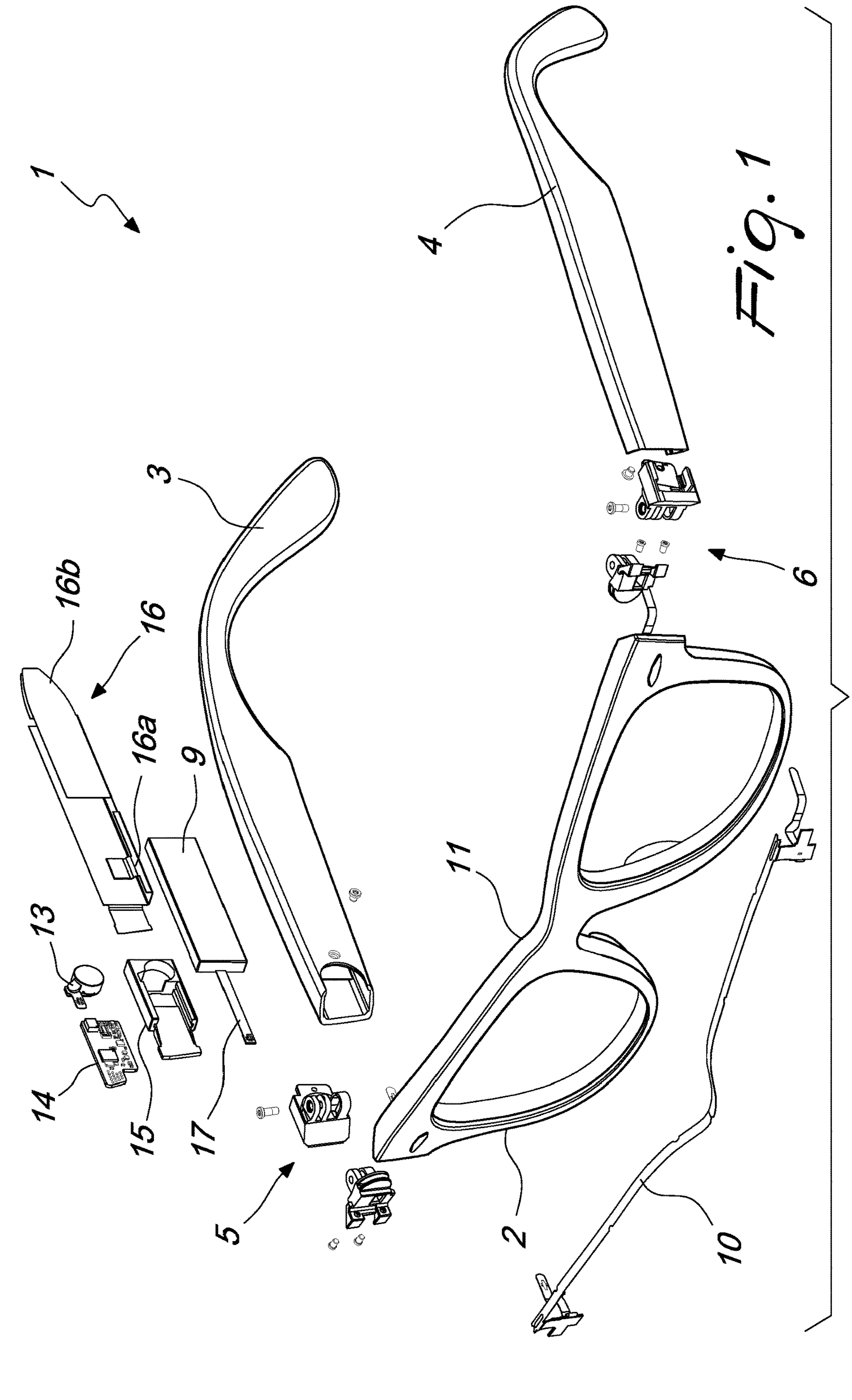
FIG. 1 is an exploded perspective view of the eyeglasses according to the disclosure.
Figure 2:
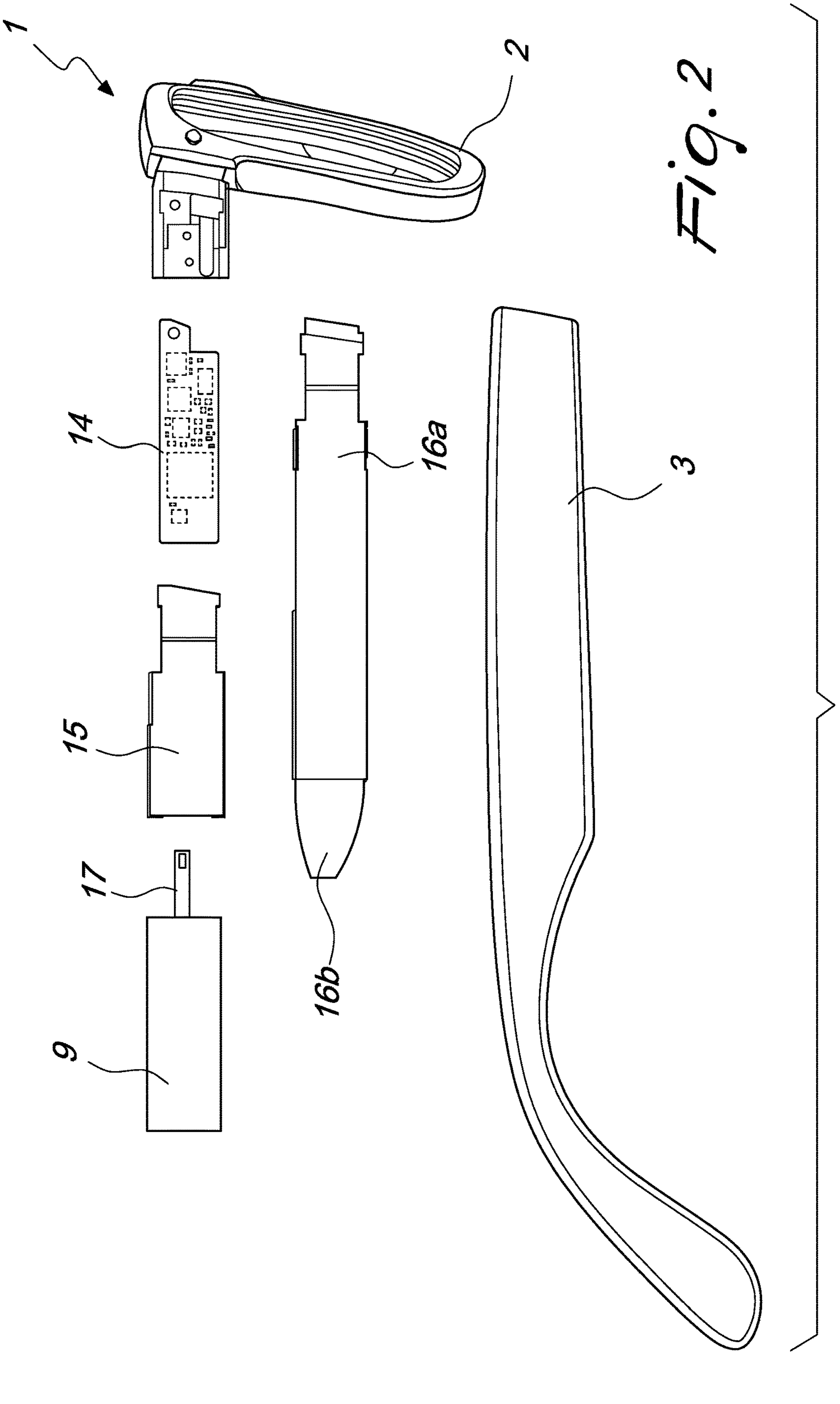
FIG. 2 is an exploded lateral perspective view of the eyeglasses according to the disclosure.

With reference to the figures, the electronic eyeglasses according to the present disclosure, generally designated by the reference numeral 1, comprise a front 2, which is adapted to be coupled to a pair of temples 3 and 4 by means of respective hinges 5 and 6. The eyeglasses are provided with a pair of lenses, not shown. The lenses can be corrective or sunglass lenses.

Conveniently, the eyeglasses have at least one battery 9 arranged inside one of the temples 3, 4. The battery 9 can be a battery of the rechargeable type and can supply power to one or more of the electronic components arranged within at least one of the temples 3, 4. The battery of the rechargeable type can be a rechargeable alkaline battery, a nickel metal hydride (NiMH) battery, a lithium ion (Li-ion) battery, a nickel cadmium (NiCd) battery, a nickel zinc battery, a nickel iron battery, or any other type of rechargeable battery suitable for charging the device. In a preferred embodiment, the eyeglasses can comprise multiple rechargeable batteries.

A power supply cable 10 is conveniently accommodated within the upper part of the front 2 of the eyeglasses, runs along the entire upper part of the front 2, and connects to the printed circuit board 14 arranged within at least one of the temples 3, 4. In one embodiment, the power supply cable 10 is accommodated within the upper part of the front 2 of the eyeglasses and in particular in a conveniently provided recessed seat over which the profile of the upper part of the front 2 is overmolded.

Conveniently, the cable 10 is flexible, carries power, can also carry data and is arranged in the front 2 so as to be substantially parallel to the upper rim 11 of the front 2 of the eyeglasses.

The flexible cable 10 is substantially arranged so as to be oriented flat within the front 2 of the eyeglasses, so as to be arranged edgeways with respect to the observer and therefore at right angles to the front 2 of the eyeglasses.

The flexible cable 10, moreover, can be connected directly to the electronics within a containment element 15 or can be connected directly by means of two isolated conductors. In both cases, the flexible electronic cable 10 can provide a constant and flexible electrical connection to the electronics accommodated within the containment element 15. It should be noted that the containment element 15 is sealed, encapsulated and highly resistant to moisture and wear.

The flexible conducting cable 10 can be of a length that begins inside the containment element 15 and exits from the temple either on the side of the temple or on the front end of the temple nearest to the hinge of the temple and then inside the connecting hinge between the temple and along the entire front 2. In other embodiments, the flexible conducting cable 10 can connect indirectly by connecting to contact points placed inside the rim of the frame of the eyeglasses or on the surface of the lens.

Conveniently, the hinges 5 and 6 are of the type that allows the passage of the flexible conducting cable 10 through them for connection to the printed circuit board 14.

Furthermore, in one embodiment, the flexible conducting cable 10 is a single cable without joints. In an alternative embodiment, the conducting cable is formed by two insulated conductors.

The position of the flexible cable 10, which is parallel to the upper rim 11 of the front 2 of the eyeglasses, allows in an alternative embodiment the optional integration of a capacitive sensor in said front 2.

At least one of the temples 3, 4 has a haptic feedback component 13 and a printed circuit board 14 which are accommodated within the containment element 15, which allows the board 14 and the haptic feedback component 13 to be accommodated in order to reduce vibrations and retain said components firmly, avoiding unwanted movements.

The haptic feedback component 13 returns a feedback, such as for example a vibration, that allows the user to realize that he is touching with his finger an active touch or input area.

The temple 3, moreover, has a capacitive sensor 16 which is conveniently constituted by a manual input capacitive sensor 16*a*, arranged at a proximal part of the temple, which forms an active area at the lower part of the temple 3, in order to allow a user to input a manual command with a finger or other manual action.

Conveniently, the capacitive sensor 16 further comprises a double capacitive sensor 16*b* at the distal part of the temple 3. The double capacitive sensor comprises two active areas, one directed toward the inside of the temple, i.e., toward the head of the user who wears the eyeglasses, and at least one other active area directed toward the outside of the temple.

Furthermore, the double capacitive sensor 16*b* can advantageously be glued to the containment element 15, to the battery 9 as well as to the active area 16*a* so as to form a single part.

Therefore, the temple 3 of the eyeglasses has substantially a first area (proximal with respect to the front 2) 16*a*, which allows the possibility of manual input by the user, and a terminal area (distal with respect to the front 2) 16*b*, at the terminal part of the temple 3, where the double capacitive sensor is arranged which allows the detection of the status of eyeglasses being worn or not worn (adherence sensor).

The protective containment enclosure 15 accommodates therefore both the printed circuit board 14 and the haptic feedback component 13.

Conveniently, the protective containment enclosure 15 accommodates inside it the printed circuit board 14 and the battery 9 with a connector 17 thereof, which makes contact with the printed circuit board 14 accommodated within the protective containment enclosure 15.

Furthermore, the protective enclosure 15 acts as support and housing of the capacitive sensor 16*a*.

Furthermore, the protective enclosure 15 contains the haptic feedback component 13 in order to return to the user a notification regarding the manual input entered or other functionalities of the eyeglasses.

It should be noted that the protective enclosure 15 can be arranged anywhere on the temple 3, 4, for example in any portion of at least one temple 3, 4 having a region or cavity designed to accept the insertion of the protective enclosure.

Figure 3:
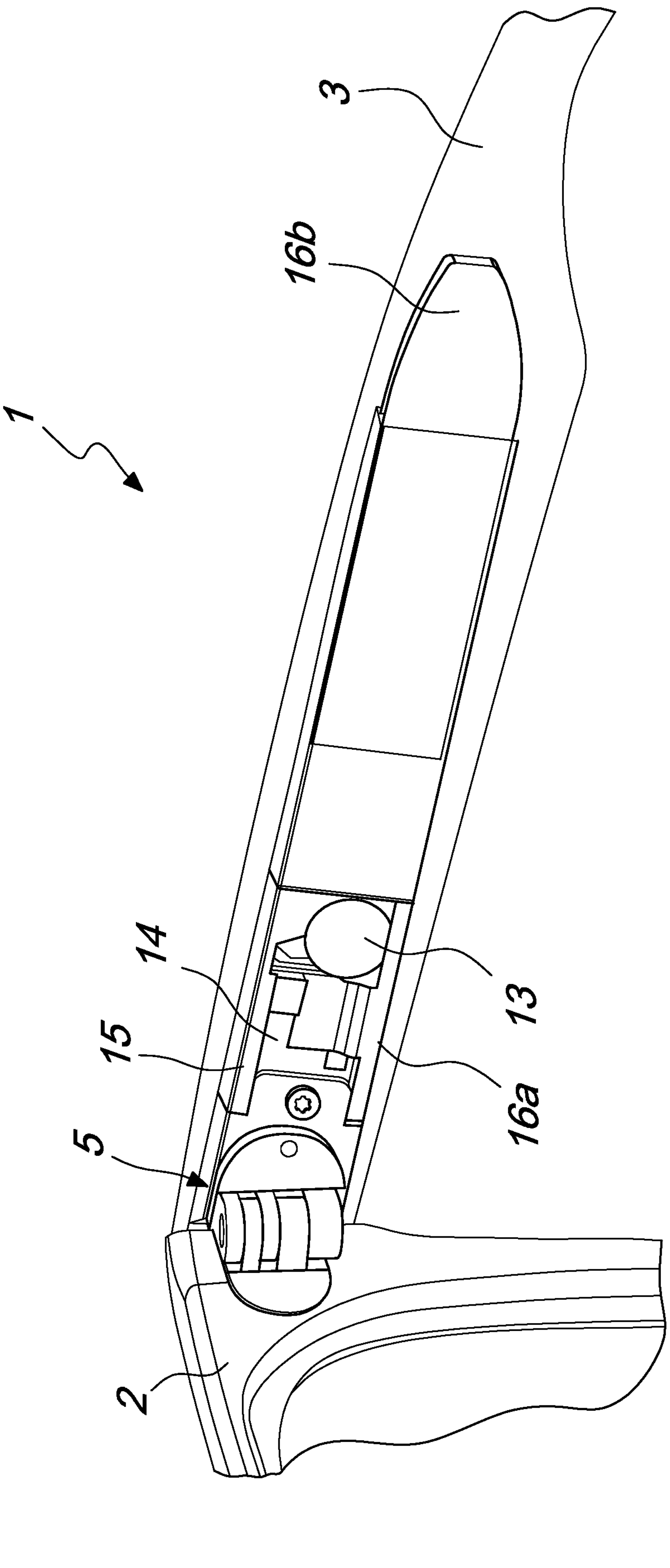
FIG. 3 is a partial perspective view, in phantom lines, of the eyeglasses according to the disclosure.
Figure 4:
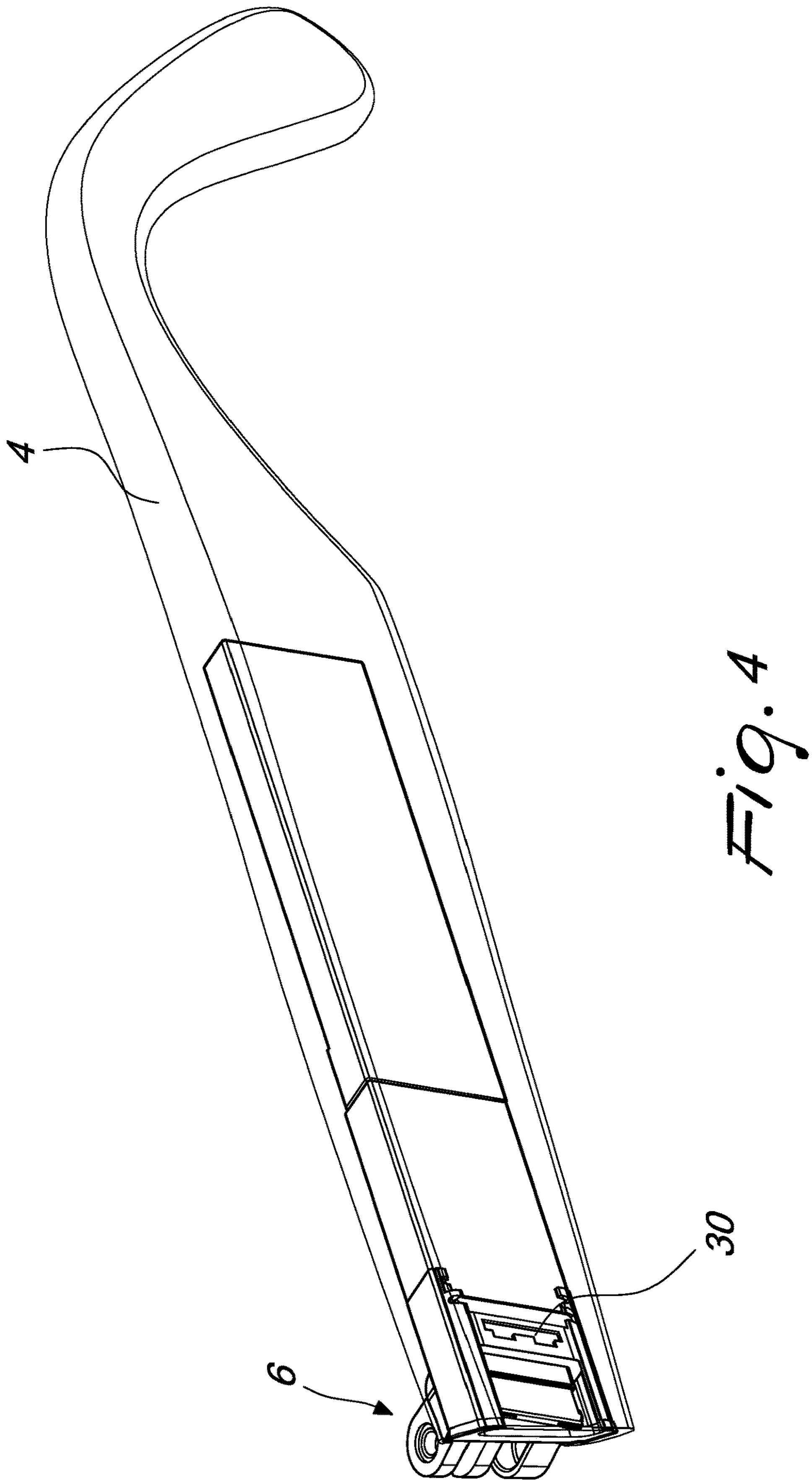
FIG. 4 is a perspective view of a temple of the eyeglasses according to the disclosure with a USB charging port.

By way of example, as shown in FIG. 3, it can be arranged near the hinge of a wide variety of frame types and styles. In particular, the protective enclosure 15 can be arranged inside any temple portion so that it is conveniently integral with the temple 3, and, as mentioned, allows to keep the printed circuit board 14 and the haptic feedback component 13 in position within the temple, without them being able to move, so as to dampen vibrations that are returned to the user and therefore provides solidity and reliability.

At the front 2 of the eyeglasses, behind a decorative element 20, arranged at at least one of the ends of the front 2, it is possible to provide a sensor, for example a light and/or temperature sensor or other known sensors adapted to detect external environmental conditions in order to provide input to the device and/or user.

The position of the flexible power supply cable 10, which is parallel to the upper rim 11 of the front 2 of the eyeglasses, allows the optional integration of a capacitive sensor in said front 2.

Recharging of the eyeglasses according to the disclosure can occur by means of an external support (for example by means of a charging enclosure) or by means of a cable via a USB port/other charging port 30 integrated on the temple 3, 4 and with the temple closed. The charging port 30 is substantially hidden from view when the temple is arranged in an open position and is in the active condition when the temple is arranged in a closed position. In particular, when the temple is arranged substantially parallel to the rear surface of the frame comprising the lenses, i.e., the temple is in the closure position, the charging port 30 can be accessed in order to allow the user to insert a charging cable in the charging port 30.

The charging port 30 is a connector chosen from a group constituted by:

a. a female connector of the USB-C type;

b. a female connector of the micro USB type;

c. a female connector of the mini USB type;

d. a connector compatible with a pogo pin cable;

e. a Lightning® female connector.

In a preferred embodiment, a power source is accommodated on at least one of the temples of the eyeglasses and is functionally coupled to a charging port 30. The charging port 30 is a female connector of the USB-C type.

In an alternative embodiment, the charging port 30 comprises furthermore a magnetic material configured to retain a charging connector in the charging port.

In a preferred embodiment, the charge indication of the battery 9 is provided by a LED emitter, located on at least one temple 3, 4 at at least one hinge 5, 6 and adapted to provide a luminous indication for notification to the user.

In practice it has been found that the eyeglasses according to the disclosure fully achieve the intended aim and objects, since the sensors are present only in one of the temples of the eyeglasses while providing the possibility of manual input by the user and of detection of the status of eyeglasses being worn or not worn.

The eyeglasses thus conceived are susceptible of numerous modifications and variations, all of which are within the scope of the accompanying claims.

Thus, for example, the eyeglasses can be of the electrochromic type.

All the details may furthermore be replaced with other technically equivalent elements.

In practice, the materials used, as well as the contingent shapes and dimensions, may be any according to the requirements and the state of the art.

The invention claimed is:

1. Electronic eyeglasses comprising a front and a pair of temples configured to be connected to the front by means of respective hinges, wherein at least one of said temples comprises a first capacitive sensor in order to allow to enter an input on the part of a user and a second capacitive sensor which is joined thereto and is configured to detect the condition of the eyeglasses being worn or not by the user and a haptic feedback component in order to return to the user a notification regarding the input entered or other functionalities of the eyeglasses, wherein said second capacitive sensor comprises at least two active areas, one active area directed toward an inside of the temple, i.e., toward the head of the user who wears the eyeglasses, and at least one other active area directed toward an outside of the temple.

2. The electronic eyeglasses according to claim 1, wherein said first capacitive sensor and said second capacitive sensor are monolithic.

3. The electronic eyeglasses according to claim 1, wherein said input by a user is of a manual type.

4. The electronic eyeglasses according to claim 1, wherein said second capacitive sensor is configured to detect a condition of the eyeglasses worn or not by the user by means of a threshold system.

5. The electronic eyeglasses according to claim 1, further comprising at least one battery accommodated in at least one of said two temples, said battery being integrated in a body of the temple and being accommodated within a same temple that accommodates said second capacitive sensor.

6. The electronic eyeglasses according to claim 1, further comprising a protective containment element for at least one of said temples, which is integral with said temples and is configured to support said first capacitive sensor, said haptic feedback component and a printed circuit board for driving said haptic sensor, said first capacitive sensor and said second capacitive sensor.

7. The electronic eyeglasses according to claim 1, further comprising a flexible power supply cable configured to be accommodated within the front of said eyeglasses and to pass through said respective hinges, in order to connect to said printed circuit board.

8. The electronic eyeglasses according to claim 1, wherein said first capacitive sensor is arranged in a proximal part of the temple and said second capacitive sensor is arranged at a distal part of the temple.

9. The electronic eyeglasses according to claim 6, wherein said second capacitive sensor is an adherence sensor configured to be glued to the protective containment element, to the battery and to the active area defined by said first capacitive sensor so as to form a single part.

10. The electronic eyeglasses according to claim 7, wherein said flexible cable is a single cable without joints.

11. The electronic eyeglasses according to claim 1, wherein a power source is accommodated on at least one of the temples of the eyeglasses and is functionally coupled to a charging port integrated on the temple.

12. The electronic eyeglasses according to claim 11, wherein said charging port is a female universal USB-C connector.

13. Electronic eyeglasses comprising a front and a pair of temples configured to be connected to the front by means of respective hinges, wherein at least one of said temples comprises a first capacitive sensor in order to allow to enter an input on the part of a user and a second capacitive sensor which is joined thereto and is configured to detect the condition of the eyeglasses being worn or not by the user and a haptic feedback component in order to return to the user a notification regarding the input entered or other functionalities of the eyeglasses, and further comprising a flexible power supply cable configured to be accommodated within the front of said eyeglasses and to pass through said respective hinges, in order to connect to said printed circuit board.

14. Electronic eyeglasses comprising a front and a pair of temples configured to be connected to the front by means of respective hinges, wherein at least one of said temples comprises a first capacitive sensor in order to allow to enter an input on the part of a user and a second capacitive sensor which is joined thereto and is configured to detect the condition of the eyeglasses being worn or not by the user and a haptic feedback component in order to return to the user a notification regarding the input entered or other functionalities of the eyeglasses, and further comprising a protective containment element for at least one of said temples, which is integral with said temples and is configured to support said first capacitive sensor, said haptic feedback component and a printed circuit board for driving said haptic sensor, said first capacitive sensor and said second capacitive sensor, wherein said second capacitive sensor is an adherence sensor configured to be glued to the protective containment element, to the battery and to the active area defined by said first capacitive sensor so as to form a single part.

* * * * *